United States Patent
Kaluza et al.

(10) Patent No.: US 10,635,557 B2
(45) Date of Patent: Apr. 28, 2020

(54) SYSTEM AND METHOD FOR AUTOMATED DETECTION OF ANOMALIES IN THE VALUES OF CONFIGURATION ITEM PARAMETERS

(71) Applicant: E.S.I. SOFTWARE LTD, Rosh HaAyin (IL)

(72) Inventors: Bostjan Kaluza, Ljubljana Polje (SI); Eyal Oz, Petah Tikva (IL); Alexander Sasha Gilenson, Givatayim (IL)

(73) Assignee: E.S.I. SOFTWARE LTD, Rosh Haayin (IL)

( * ) Notice: Subject to any disclaimer, the term of this patent is extended or adjusted under 35 U.S.C. 154(b) by 681 days.

(21) Appl. No.: 15/437,465

(22) Filed: Feb. 21, 2017

(65) Prior Publication Data

US 2018/0239682 A1   Aug. 23, 2018

(51) Int. Cl.
*G06F 16/23*      (2019.01)
*G06F 11/30*      (2006.01)
*G06F 7/02*       (2006.01)

(52) U.S. Cl.
CPC .......... *G06F 11/3006* (2013.01); *G06F 7/02* (2013.01); *G06F 11/3051* (2013.01); *G06F 11/3082* (2013.01); *G06F 16/2365* (2019.01); *G06F 16/2379* (2019.01)

(58) Field of Classification Search
CPC ..................... G06F 16/2379; G06F 16/2365
USPC ........................................................ 707/748
See application file for complete search history.

(56) References Cited

U.S. PATENT DOCUMENTS

| | | | |
|---|---|---|---|
| 10,397,236 B1* | 8/2019 | Chadha | H04L 63/1441 |
| 10,459,827 B1* | 10/2019 | Aghdaie | G06N 20/00 |
| 2014/0325643 A1* | 10/2014 | Bart | H04L 63/1425 726/22 |
| 2015/0106927 A1* | 4/2015 | Ferragut | H04L 63/1416 726/23 |
| 2015/0220868 A1* | 8/2015 | Elashoff | G06Q 10/06395 705/2 |
| 2015/0235152 A1* | 8/2015 | Eldardiry | G06F 21/552 705/7.28 |
| 2016/0147583 A1* | 5/2016 | Ben Simhon | G06F 11/076 714/47.3 |
| 2017/0366568 A1* | 12/2017 | Narasimhan | G06F 16/958 |
| 2018/0191763 A1* | 7/2018 | Hillard | H04L 63/1425 |

\* cited by examiner

*Primary Examiner* — Joshua Bullock
(74) *Attorney, Agent, or Firm* — Soroker Agmon Nordman

(57) ABSTRACT

A method for analyzing and prioritizing configuration parameters in an information technology system, including collecting configuration parameters from computer stations connected in a network implementing the information technology system, storing the collected configuration parameters in a database, analyzing the configuration parameters by a set of anomaly routines, wherein each anomaly routine checks for a specific type of anomaly and provides a score representing a level of conformity of the value of the configuration parameters to the anomaly, aggregating the anomaly scores; and outputting a list of configuration parameters with an aggregated anomaly score.

20 Claims, 5 Drawing Sheets

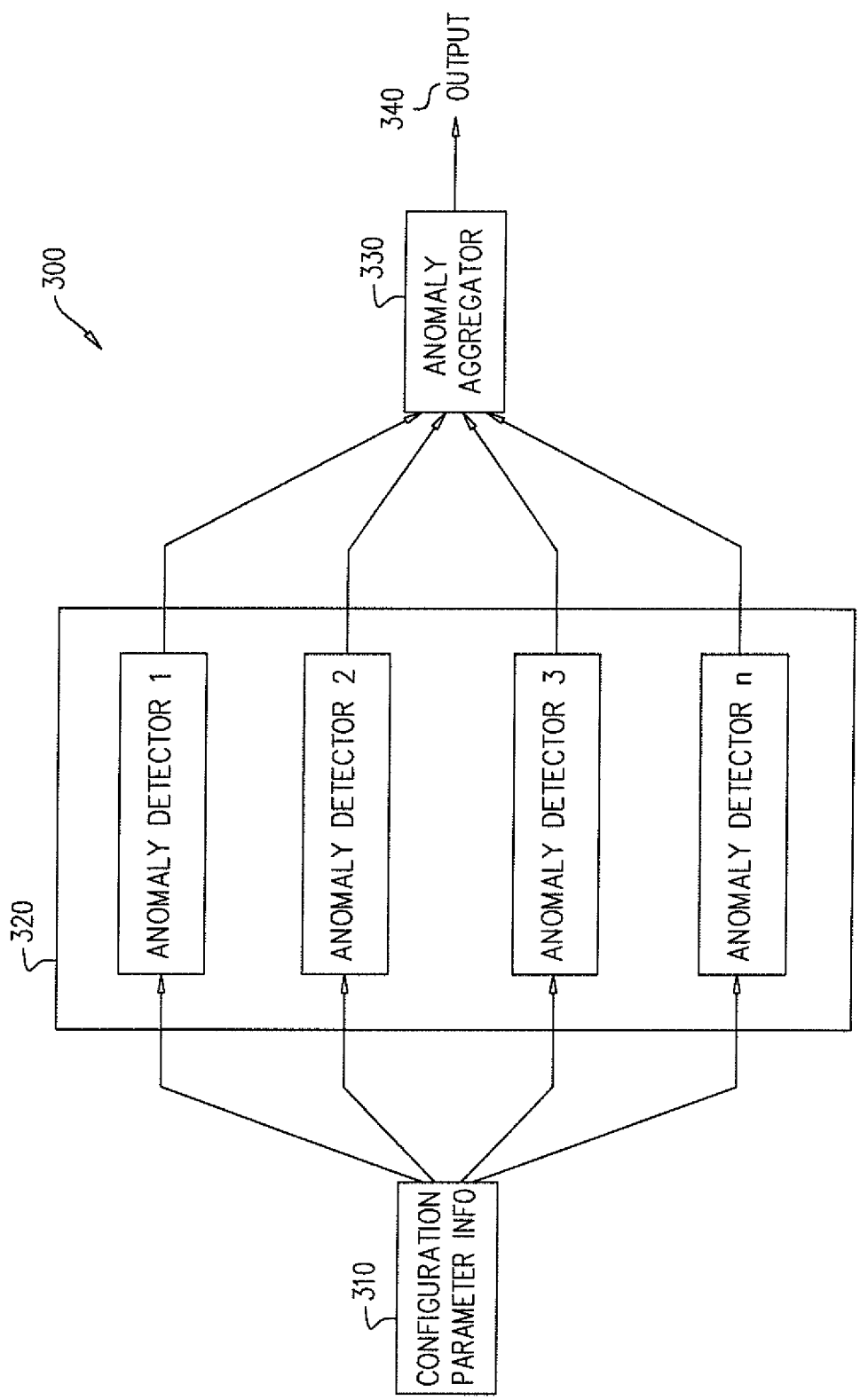

SYSTEM AND METHOD FOR AUTOMATED DETECTION OF ANOMALIES IN THE VALUES OF CONFIGURATION ITEM PARAMETERS

TECHNICAL FIELD

The present disclosure relates generally to monitoring values of granular configuration parameters in information technology (IT) systems over time, and more specifically to the analysis of configuration parameter values in the monitored items to identify anomalies.

BACKGROUND

In the past decades information technology (IT) systems have evolved and increased in complexity. In the past a company would use a single computer with a single operating system and small number of programs to supply the computational needs of the company. Nowadays enterprise companies may have hundreds and thousands of computers interconnected over a network. The company may use multiple servers and multiple databases to service hundreds and thousands of computers connected to them. Essentially each layer of the IT system has evolved and become more complex to control and manage. In some cases multiple servers may be installed with identical software and load balancers may be used to regulate access to the servers. An average business system includes tens or hundreds of thousands of configuration parameters. For example Windows OS contains between 1,500 to 2,500 configuration parameters. IBM WebSphere Application Server has about 16,000, and Oracle Weblogic more than 60,000. If any of these parameters are misconfigured or omitted the change may impact proper operation of the IT system.

The dependence of IT systems on the configuration can have serious consequences, for example in November 2014 Microsoft Azure Services suffered a devastating event that interrupted six availability zones in the U.S., two in Europe, and four in Asia for as much as 11 hours. It turned out that a configuration change had been introduced as part of an Azure Storage update to improve performance as well as reducing the CPU footprint. This change had been deployed to some production clusters in the previous weeks and was performing as expected. However, the configuration change exposed a bug resulted in the application to go into an infinite loop not allowing it to take traffic. Nowadays especially with the help of the Internet, upgrades for some software packages may be released on a daily basis and even automatically applied. If a problem arises in response to an upgrade most systems are incapable of presenting an administrator with a list of changes let alone suggest what changes are the most probable cause of the problem.

It is thus desirable to improve the ability to avoid problems in IT system updates and day-to-day operation and to reduce the mean time to resolution (MTTR) for handling problems that still occur in the IT systems. The prevention of problems and reduction of the MTTR can help to prevent economic damage to the organization.

A few companies have developed software products that help system administrators to keep track of computer configurations. These products detect values of granular configuration items (CI). Typically, such products collect and store the configuration items (CI) in a database so that the current value of a configuration item may be compared to prior values or to similar machines. The products may also bundle configuration items into composite CI's to enable easier visualization of the CI's, for example by grouping them by their type or content. Once the configuration items are collected an IT user (e.g. engineer, system administrator) may need to analyze hundreds, thousands or millions of configuration items to detect the source of a problem.

SUMMARY

An aspect of an embodiment of the disclosure relates to a system and method for analyzing and prioritizing configuration parameter values of applications in an information technology system. The system includes an agent application that is installed on stations connected in a network implementing the information technology system. The agent application collects configuration parameters of applications installed on the stations including the details of the hardware of the stations. The collected configuration parameters are stored in a database. In some embodiments of the disclosure, a computer server accesses the database and analyzes the configuration parameters by comparing the values of previous configuration parameters with the values of configuration parameters at later times, for example the current values. Then the computer server identifies configuration parameter changes and analyzes the changes by applying a set of anomaly routines in which each routine checks the change to identify a score of conformity of the change to a specific anomaly. Alternatively or additionally, the analysis may detect anomalies directly on configuration parameter values without comparing the configuration parameter values to previous values and identifying changes.

The anomaly scores are aggregated for each configuration parameter or change to identify the most suspicious values, for example those values that receive the highest score in violating what is expected of them.

In an exemplary embodiment of the disclosure, the set of anomaly routines include:
1. a data type anomaly;
2. a relative difference anomaly;
3. a benchmark anomaly;
4. a delta anomaly;
5. a consistency anomaly;
6. a policy violation anomaly; and
7. other types of anomalies.

Optionally, at least two or three of the above anomalies are performed on each configuration parameter and/or identified change. Some of the anomaly routines may be applied only to numerical data or only to non-numerical data. Whereas other anomaly routines may be applied to all types of data. In an exemplary embodiment of the disclosure, each anomaly routine provides as output a score representing a level of conformity of the value to violating the specific anomaly. Optionally, an anomaly that is only relevant to a change is only applied on changes and otherwise provides a neutral score. Likewise an anomaly that only applies to a configuration parameter value is only applied to the configuration parameter and ignores previous values.

There is thus provided according to an exemplary embodiment of the disclosure, a method of analyzing and prioritizing configuration parameters in an information technology system, comprising:

collecting configuration parameters from computer stations connected in a network implementing the information technology system;

Storing the collected configuration parameters in a database;

Analyzing the configuration parameters by a set of anomaly routines, wherein each anomaly routine checks for a specific type of anomaly and provides a score representing a level of conformity of the value of the configuration parameters to the anomaly;

Aggregating the anomaly scores; and

Outputting a list of configuration parameters with an aggregated anomaly score.

In an exemplary embodiment of the disclosure, the analyzing further comprises:

Comparing the values of configuration parameters of a station from a later time with previous values of configuration parameters of the station;

Determining changes in the configuration parameters by said comparing;

Analyzing the determined changes by a set of anomaly routines, wherein each anomaly routine checks for a specific type of anomaly and provides a score representing the level of conformity of the changes in the configuration parameters to the anomaly. Optionally, the anomaly routines analyze the configuration parameters and/or changes based on previous values, later values and meta-data related to the configuration parameters. In an exemplary embodiment of the disclosure, the anomaly routines include comparing the data type of the previous value to the data type of the value at the later time and identifying an anomaly if the data type changed. Optionally, a data type change from a numerical value to a non-numerical value or vice versa is more severe and is designated by a higher anomaly score than a change from one numerical representation to another. In an exemplary embodiment of the disclosure, the anomaly routines include identifying a relative difference anomaly that measures the difference between the previous value and the later value relative to the previous value. Optionally, a downgraded software version is designated by a higher anomaly score than an upgraded version. In an exemplary embodiment of the disclosure, an IP address change designating a network change is designated by a higher anomaly score than a subnet address change in the same local area network. Optionally, the anomaly routines include identifying a benchmark anomaly that estimates if the value of the configuration parameter is in an expected range of values; wherein the expected range of values is obtained based on the values of the same configuration parameter in other stations of the network. In an exemplary embodiment of the disclosure, the score for the benchmark anomaly is calculated as a Kullback-Leibler divergence between the likelihood of an expected value and the value of the configuration parameter. Optionally, the anomaly routines include identifying a delta anomaly that estimates if the value of the configuration parameter is in an expected range of values; wherein the expected range of values is obtained based on the values of the same configuration parameter in other stations of the network. In an exemplary embodiment of the disclosure, the score for the delta anomaly is calculated as a Kullback-Leibler divergence between the likelihood of an expected value and the value of the configuration parameter. Optionally, the anomaly routines include identifying a consistency anomaly that verifies that the value of the configuration parameter is consistent with the changes in similar stations. In an exemplary embodiment of the disclosure, the anomaly routines include identifying a policy violation anomaly that verifies that the value of the configuration parameter does not violate a user specified rule.

There is further provided according to an exemplary embodiment of the disclosure, a system for analyzing and prioritizing configuration parameters of applications in an information technology system, comprising:

An agent application configured to collect configuration parameters of applications executed on computer stations connected in a network implementing the information technology system;

A database configured to store the collected configuration parameters;

A server computer configured to execute a program that analyzes the configuration parameters by a set of anomaly routines, wherein each anomaly routine checks for a specific type of anomaly and provides a score representing a level of conformity of the value of the configuration parameter to the anomaly; aggregating the anomaly scores; and outputting a list of configuration parameters with an aggregated anomaly score.

In an exemplary embodiment of the disclosure, analyzing the configuration parameters further comprises:

Comparing the values of configuration parameters of a station from a later time with previous values of configuration parameters of the station;

Determining changes in the configuration parameters by said comparing;

Analyzing the determined changes by a set of anomaly routines, wherein each anomaly routine checks for a specific type of anomaly and provides a score representing the level of conformity of the changes in the configuration parameters to the anomaly. Optionally, the anomaly routines include comparing the data type of the previous value to the data type of the value at the later time and identifying an anomaly if the data type changed. In an exemplary embodiment of the disclosure, the anomaly routines include identifying a relative difference anomaly that measures the difference between the previous value and the value at the later time relative to the previous value.

There is further provided according to an exemplary embodiment of the disclosure, a non-transitory computer readable medium for storing program code to execute the method described above.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear, wherein:

FIG. 3 is a schematic block diagram of components for calculating an anomaly score for configuration parameters or changes, according to an exemplary embodiment of the disclosure;

DETAILED DESCRIPTION

Figure 1:
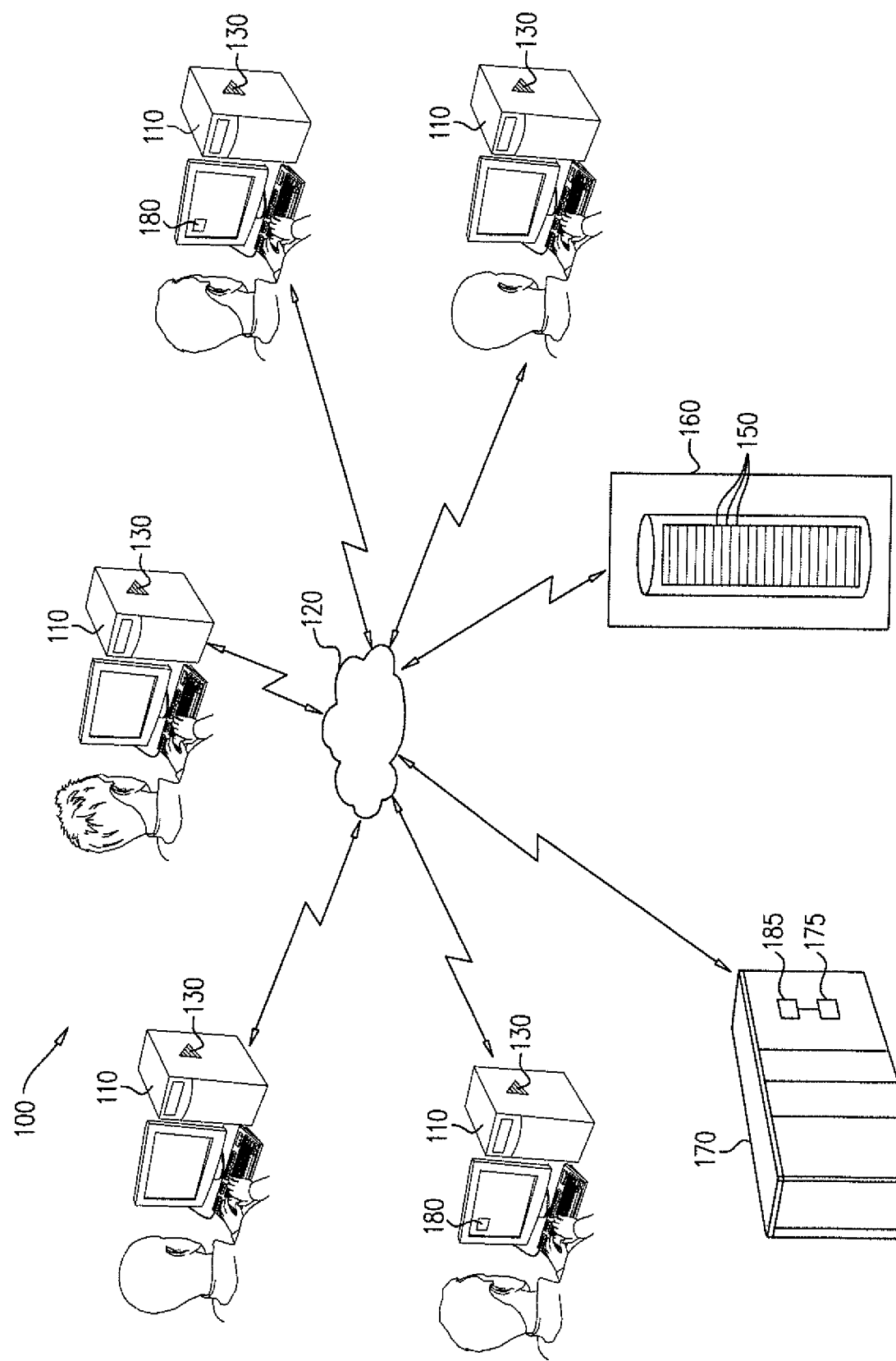
FIG. 1 is a schematic illustration of a network of computers connected in an information technology system, according to an exemplary embodiment of the disclosure.

FIG. 1 is a schematic illustration of a network of computers connected in an information technology (IT) system 100, according to an exemplary embodiment of the disclosure. In an exemplary embodiment of the disclosure, IT system 100 includes multiple stations 110 connected over a network 120. Optionally, each station 110 may serve as a workstation for accessing servers or may be a server for providing services to users of workstations. Network 120 may be a local area network (LAN), a wide area network (WAN) (e.g. the Internet) or any other type of network over which stations 110 may communicate. Optionally, each station 110 executes an agent application 130 for monitoring and collecting information at the station 110. The collected information includes configuration parameters 150 relating to the hardware and software installed in the stations 110 of IT system 100. Optionally, the configuration parameters 150 may be collected periodically or upon occurrence of a change to the configuration parameters 150. In some embodiments of the disclosure, the configuration parameters may be only collected on specific stations 110, for example only on servers or only on specific servers that are important to IT system 100.

The stations 110 may be any type of general purpose computer having a processor and memory. Optionally, they may be standard desktop computers, dedicated server computers, rack mount computers, laptop computers, mobile devices (e.g. smartphones) or any other type of computer.

In an exemplary embodiment of the disclosure, the information collected by agent application 130 is stored in a database 160 (e.g. an external disk that is connected to network 120). Optionally, an agent server 170 analyzes the collected information to detect differences between installations of the same applications on different work stations/servers, or changes over time on the same workstation/server or on different workstations/servers. In some embodiments of the disclosure, agent application 130 and/or the program for agent server 170 is stored on a non-transitory medium for distribution to administrators to be installed. Optionally, the non-transitory medium includes hard disks, flash drives, CD-ROM's, DVD's, a printed hardcopy and other known medium.

In some embodiments of the disclosure, instead of installing a dedicated agent application 130, the information is collected by standard API applications that are executed by the local operating system on the station 110 responsive to a request from agent server 170 or from other computer stations 110. Optionally, agent server 170 polls the stations 110 to extract the information instead of extracting the information directly from database 160, and then agent server 170 stores the information in database 160.

The configuration parameters 150 may include hardware details of the station 110, for example the amount of RAM, processor model, disk size, and models of devices attached. Optionally, the configuration parameters 150 may include firmware details, such as BIOS version, BIOS size and a checksum (e.g. CRC). Alternatively or additionally, the configuration parameters 150 may include details of application software installed on the station 110, including metadata (e.g. when installed and by whom) and application data. The applications may include operating systems, client server applications, database applications, or corporate applications used by a corporation to support the corporate activity, for example the applications may include SQL servers and web servers.

In an exemplary embodiment of the disclosure, configuration parameters 150 may include: application identity, application version, date of installation, name of the user that installed the application, updates installed, drivers installed, names and sizes of files belonging to each application, values of controllable parameters for configuring applications, file sizes, file checksums, registry content, available RAM, available disk space and any other information for identifying the status or effect of the software installed on the stations 110. Optionally, the number of recorded parameters dealt with by IT system 100 may be between 10 to 100, 100 to 1000, 1000 to 10000, 10000 to 100000 or more.

In some embodiments of the disclosure, agent application 130 may be installed on one or more stations 110 that are not connected together over a network, for example at different organizations/clients. Optionally, the information may be stored locally and collected for example using an external disk, USB flash drive or by temporarily connecting the station to a wide area network such as the Internet and transmitting the information to database 160. In an exemplary embodiment of the disclosure, agent server 170 can be used to compare similar installations of applications at different organizations/clients to debug applications or resolve problems in installations.

Figure 2A:
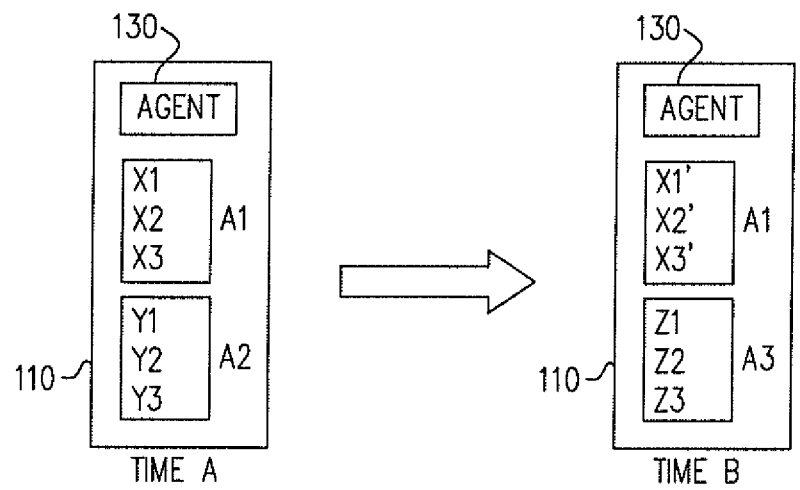
FIG. 2A is a schematic illustration of configuration parameters of an exemplary station in an information technology network at two different times, according to an exemplary embodiment of the disclosure.

FIG. 2A is a schematic illustration of configuration parameters of an exemplary station in an information technology network at two different times, according to an exemplary embodiment of the disclosure. In an exemplary embodiment of the disclosure, agent 130 examines station 110 at time A to determine configuration parameters. Station 110 may have installed applications A1, A2 with configuration parameters (X1, X2, X3) and (Y1, Y2, Y3) respectively. At time B station 110 may have installed applications A1 and A3 (instead of A2) with configuration parameters (X1', X2', X3') and (Z1, Z2, Z3) respectively. Optionally, this information is stored in database 160 and analyzed by agent server 170 to analyze configuration parameters 150 and identify changes between the configuration parameters 150 on station 110 over time.

Figure 2B:
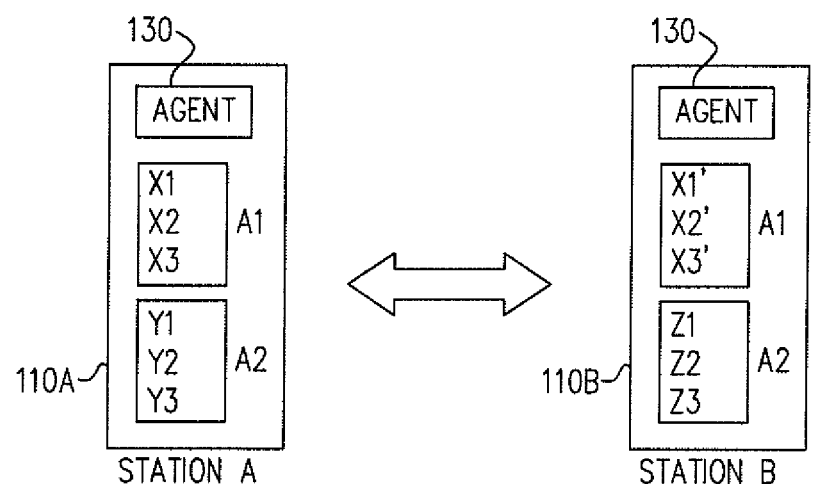
FIG. 2B is a schematic illustration of configuration parameters of two different stations in an information technology network at essentially the same time, according to an exemplary embodiment of the disclosure.

FIG. 2B is a schematic illustration of configuration parameters of two different stations in an information technology network 100 at essentially the same time, according to an exemplary embodiment of the disclosure. In an exemplary embodiment of the disclosure, agent 130 examines a first station 110A at a specific time. An agent application 130 installed on a second station 110B examines the second station 110B at essentially the same time. In an exemplary embodiment of the disclosure station 110A may have installed applications A1 and A2 with configuration parameters (X1, X2, X3) and (Y1, Y2, Y3) respectively. Likewise station 110B may also have installed applications A1 and A2 with configuration parameters (X1', X2', X3') and (Y1, Y2, Y3) respectively on station 110B. Optionally, this information is stored in database 160 and analyzed by agent server 170 for determining anomalies/changes/differences based on the configuration parameters 150 of an installation on one station relative to another, for example wherein one application has the same configuration parameters and one application has different parameters as illustrated in FIG. 2B.

FIG. 3 is a schematic block diagram 300 of components for calculating an anomaly score for configuration parameters or changes, according to an exemplary embodiment of the disclosure. In an exemplary embodiment of the disclosure, at specific times, periodically or when agent server 170 identifies a new value in a configuration parameter 150 it collects information 310 related to the change, for example including the new value, the old value and meta-data related to the configuration parameter 150 or change, for example identity of the server/workstation where it occurred, what application or hardware the parameter belongs to and any limitations known about the values of the configuration parameter 150 (e.g. data type definition, allowed value range). Optionally, the information is provided to one or more anomaly detector routines 320 (e.g. a set of anomaly routines). Each routine analyzes the information for conformity to a different type of anomaly and provides an anomaly score. The anomaly scores are aggregated by an anomaly aggregator component 330 that provides a list or decision from an output component 340 regarding a level of deviation of the changes from what is expected. Optionally an anomaly may deal with values of configuration parameter changes (e.g. value before and value after) or configuration parameters values (e.g. current value regardless of previous values).

A first type of anomaly is a data type anomaly. The data type defines syntax, representation, behavior, value range, memory size and operations for use with a data item. By determining the data type of a previous value of a configuration parameter 150 and comparing it to the current value, agent server 170 can identify a "data type" anomaly, e.g. a change in the data type. Alternatively, when analyzing a current value of a known data type the configuration parameter 150 value can be analyzed for conformity to the data type. In an exemplary embodiment of the disclosure, the data types include: Boolean, integer, decimal, date, IP address, pointer, version, string and others. Optionally, the data types can be user defined as in object oriented programming languages (e.g. C++). In an exemplary embodiment of the disclosure, some changes may be considered severe and some may be considered trivial. Optionally, a score is given to the change indicating a level of severity, for example if a value changed from a numerical value to a non-numerical value (e.g. integer to character) or vice versa it is considered more severe than changing from one numerical representation to another (e.g. integer to decimal or integer to floating point). In some cases the change is identified by the value of the configuration parameter 150, by the meta-data provided with the configuration parameter 150 or both.

Another type of anomaly is a relative difference anomaly. The relative difference $\Delta_r$ measures the ratio of change by comparing the previous value $v_{t-1}$ as a reference point to the new value $v_t$. Relative difference estimates the difference between different data types including numbers, Boolean values, Date values and String values. The string data type may include specific formats such as a network IP value and a program version. The resulting value could be numeric or literal (e.g. a specific word or phrase). In an exemplary embodiment of the disclosure, if the relative difference is greater than a preselected value or equal to a specific value (e.g. term) the change is regarded as an anomaly In the case of a number and/or a Boolean data type the relative difference is defined as a ratio between the difference between the previous value and the current value divided by the previous value:

$$\Delta_r(v_{t-1}, v_t) = \begin{cases} 1; & v_{t-1} = 0 \\ \frac{v_{t-1} - v_t}{v_{t-1}}; & \text{else} \end{cases}$$

Optionally, Boolean values include strings having two states, for example "on", "enabled", "yes" and the like. Boolean string values can be transformed to a numerical representation 0 and 1 to calculate the relative difference. If the value is not defined, it can be given a default value, for example 0.

In the case of a date the relative difference can be defined by translating the date into a numerical value based on the non-decimal date segments (e.g. seconds, minutes, hours, days, weeks, months, years). Then the difference can be calculated as a ratio between the previous value and the current value divided by the previous value.

In the case of a version type the version may be represented by a string for example in the following format: "<major version>.<minor version>.<patch>.<build>". The format is matched left-to-right, hence matching major version is matched first. The version can be presented as a list of values (e.g. a vector).

The relative difference can be represented, for example as:

$$\Delta_r(v_{t-1}, v_t) = \begin{cases} \text{major upgrade}; & v_{t-1}(\text{major}) < v_t(\text{major}) \\ \text{major downgrade}; & v_{t-1}(\text{major}) > v_t(\text{major}) \\ \text{minor upgrade}; & v_{t-1}(\text{minor}) < v_t(\text{minor}) \\ \text{minor downgrade}; & v_{t-1}(\text{minor}) > v_t(\text{minor}) \\ \text{patch upgrade}; & v_{t-1}(\text{patch}) < v_t(\text{patch}) \\ \text{patch downgrade}; & v_{t-1}(\text{patch}) > v_t(\text{patch}) \\ \text{build upgrade}; & v_{t-1}(\text{build}) < v_t(\text{build}) \\ \text{build downgrade}; & v_{t-1}(\text{build}) > v_t(\text{build}) \\ \text{no change}; & \text{else} \end{cases}$$

In the case of a network IP address data type the IP address may be represented by a string that is decomposed into four parts using the following format: "<subnet/0>.<subnet/8>.<subnet/16>.<subnet/24>".

Optionally, the relative difference can be defined as:

$$\Delta_r(v_{t-1}, v_t) = \begin{cases} \text{subnet/0}; & v_{t-1}(\text{subnet/0}) \neq v_t(\text{subnet/0}) \\ \text{subnet/8}; & v_{t-1}(\text{subnet/8}) \neq v_t(\text{subnet/8}) \\ \text{subnet/16}; & v_{t-1}(\text{subnet/16}) \neq v_t(\text{subnet/16}) \\ \text{subnet/24} & v_{t-1}(\text{subnet/24}) \neq v_t(\text{subnet/24}) \end{cases}$$

In an exemplary embodiment of the disclosure an IP address that indicates a network change is designated by a larger anomaly score, for example changing from one local area network to another in contrast to a subnet change in the same network. Likewise the anomaly score for a version change is higher for a major version change than a minor version change. In some embodiments of the disclosure, a downgraded version is considered more severe and is designated with a higher anomaly score than an upgraded version.

Figure 4:
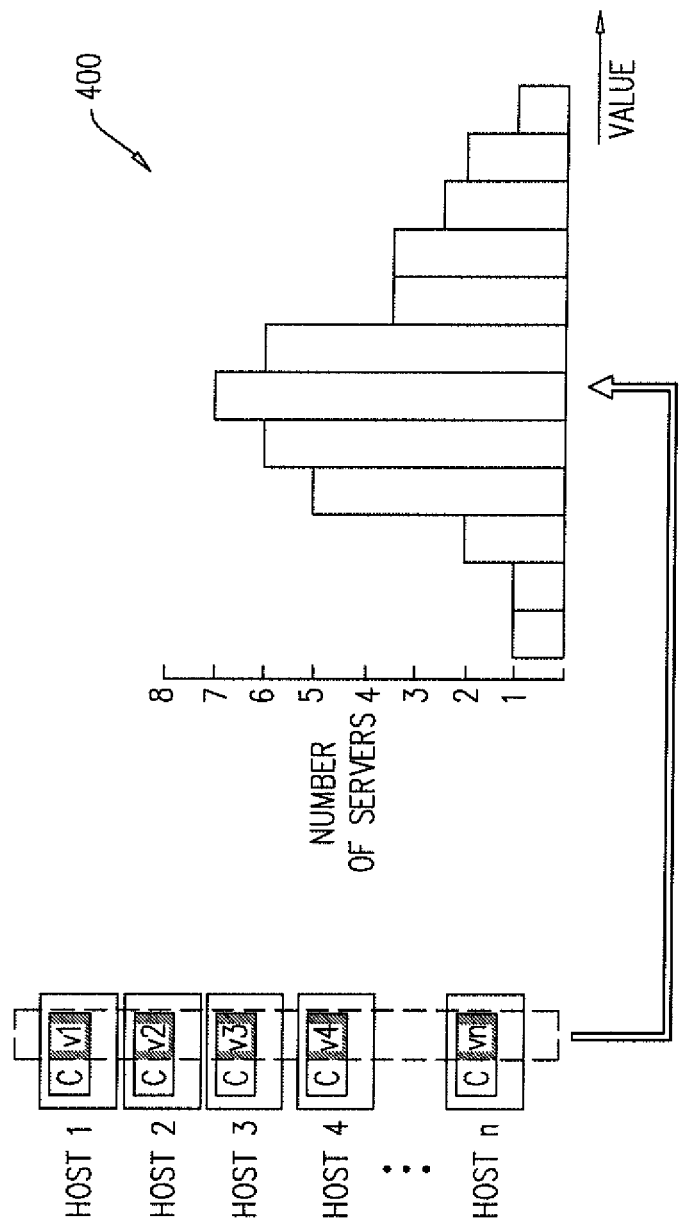
FIG. 4 is a histogram showing values of configuration parameters from multiple servers or stations, according to an exemplary embodiment of the disclosure.

Another type of anomaly is a benchmark anomaly. The benchmark anomaly estimates if the new value is in the expected range of values. The expected range of values is obtained based on the values of the same parameters in other systems of the organization or from information provided by the software designer. For example, if new value of configuration parameter connectionPoolSize in MSSQL at host1 is 40. Agent server 170 checks the value of the same parameter at other hosts and constructs a histogram 400 of values as shown in FIG. 4. The histogram shows the number of servers having each value.

In an exemplary embodiment of the disclosure, a benchmark anomaly score is calculated as a Kullback-Leibler divergence between the likelihood of an expected value of a configuration parameter among all hosts and the actual new value.

$$D_{KL}(E[CI], v_t) = P(v=E[CI]) * \log (P(v=E[CI])/P(v=v_t))$$

Wherein:

$v_t$=is the current value at time step t (time step changes whenever the value changes, e.g, t−1 would be the previous value);

$P(v=v_t)$=is the probability that a configuration parameter value v has a concrete value $v_i$;

E[CI]=expected value of the configuration item parameter. This is the most frequent value in the histogram, i.e., E[CI]=argmax$_v$(P(v=$v_i$));

$D_{KL}$=Kullback-Leiber Divergence.

The actual probabilities are calculated according to the underlying data type using the histogram as empirical value distribution. In an exemplary embodiment of the disclosure, the configuration parameters can include categorical values or numerical values. Categorical values take on values that are names of labels, buckets, and categories. As such there is no natural sorting and many arithmetic operations do not apply. The probability is calculated as a frequency of a particular value among all the possible values. The term α in the function below corresponds to a-priori knowledge of how many times a particular configuration parameter 150 appears. It could be estimated by analyzing publicly available data, transferred from analysis of configuration parameters at another organization, and/or downloading from a repository of values.

$$P(v=v_i) = \frac{n_i + \alpha_i}{N + \sum_{i=1}^{N} \alpha_i}$$

The Probability of the expected value is calculated as:

$$P(v=E[CI]) = \max_i [P(v=v_i)]$$

Wherein:

$v_t$=is the current value at time step t (time step changes whenever the value changes, e.g, t−1 would be the previous value);

$P(v=v_t)$=is the probability that a configuration parameter value v has a concrete value $v_i$;

$n_i$=the number of time specific value appeared in the histogram;

$\alpha_i$=an apriori number of times a specific value appeared in the histogram. This effectively introduces an initial distribution of values that helps when we don't have enough data. As we get more data as evidence, the initial distribution is updated.

E[CI]=is the expected value of the configuration item parameter. This is the most frequent value in the histogram, i.e., E[CI]=argmax$_v$(P(v=$v_i$)).

Quantitative values have numerical values for which arithmetic operations make sense. In this case, we calculate a probability value that allows us to decide if a numerical value is different from the mean of values that have been seen in other configuration items.

Another type of anomaly is a Delta anomaly. The Delta anomaly estimates if the relative change is in the expected range of values. The expected range of values is obtained from the relative change values of the same parameters at the other systems in the organization. For example, the new value of configuration parameter connectionPoolSize in MSSQL at host1 changed from 20 to 40, relative change is 20. The method queries relative change of the same parameter at other hosts and constructs a histogram of values as for example shown in FIG. 4.

In an exemplary embodiment of the disclosure, the Delta anomaly score is calculated as a Kullback-Leibler divergence between the likelihood of expected relative change of configuration item among all hosts and the relative change between the new value and the previous value. Calculation is performed in a similar manner as for benchmark anomaly.

Another type of anomaly is a Consistency anomaly. The Consistency anomaly detection assumes there is a set of configurations at particular hosts that should be configured in exactly the same way. Such a set could be either specified by a user or identified automatically from existing environments, topological structure or obtained from a configuration management database (CMDB).

Given such a set of configurations, the consistency anomaly marks as an anomaly any drift in values. Compared to benchmark anomaly, consistency anomaly works on a carefully curated list of configuration parameters for which it is known that they should have the same value (e.g. production hosts serving the same application behind a load balancer).

Another type of anomaly is a policy violation anomaly. Policy violation occurs if a change violates a user specified rule. For example, the user may specify that the java version of the system should be exactly 1.9.2. The actual value of a configuration is then compared to the specified policy and if it doesn't match, it raises a policy violation.

In an exemplary embodiment of the disclosure, other anomalies may be checked for and detected, for example anomalies related to the frequency of changes of a specific configuration parameter 150. The frequency may be calculated as the number of times this specific configuration parameter 150 changed in a given time frame (e.g. a higher score may be associated if the identified change frequency is higher or lower relative to the frequency of the same parameter on other servers—some parameters are known to toggle back and forth whereas others do not change very often). Likewise anomalies may include authorization anomalies wherein a change that is performed at a wrong time (e.g. not during workhours or on a weekend) or by an unauthorized user (e.g. not by an administrator) might be assigned a high score.

Optionally, aggregator component 330 receive the anomaly scores from the anomaly detector routines 320. The aggregator component 330 uses a decision function to determine if the combined scores of one or more anomaly detector routines 320 warrant taking actions, for example alerting an administrator to check a configuration parameter 150 or change. Alternatively or additionally, the aggregator component 330 may provide a list of all configuration parameters and/or changes and an anomaly score for each.

In an exemplary embodiment of the disclosure, the decision function might consist of threshold values for particular anomaly detector routines 320 and/or operators on the output. The decision function might consist of a decision tree model or the decision function might consist of any other machine-learning model such as logistic regression, support vector machines, neural networks and others.

In some embodiments of the disclosure, the aggregator component 330 produces a final score that could be used to rank a list of configuration parameters. The ranking pushes configuration parameters with the largest anomaly value to the top. Such a ranked list may be consumed by the end user (via terminal, computer screen, printed report, etc.) to prioritize incident investigation, to proactively manage environments and other tasks.

Figure 5:
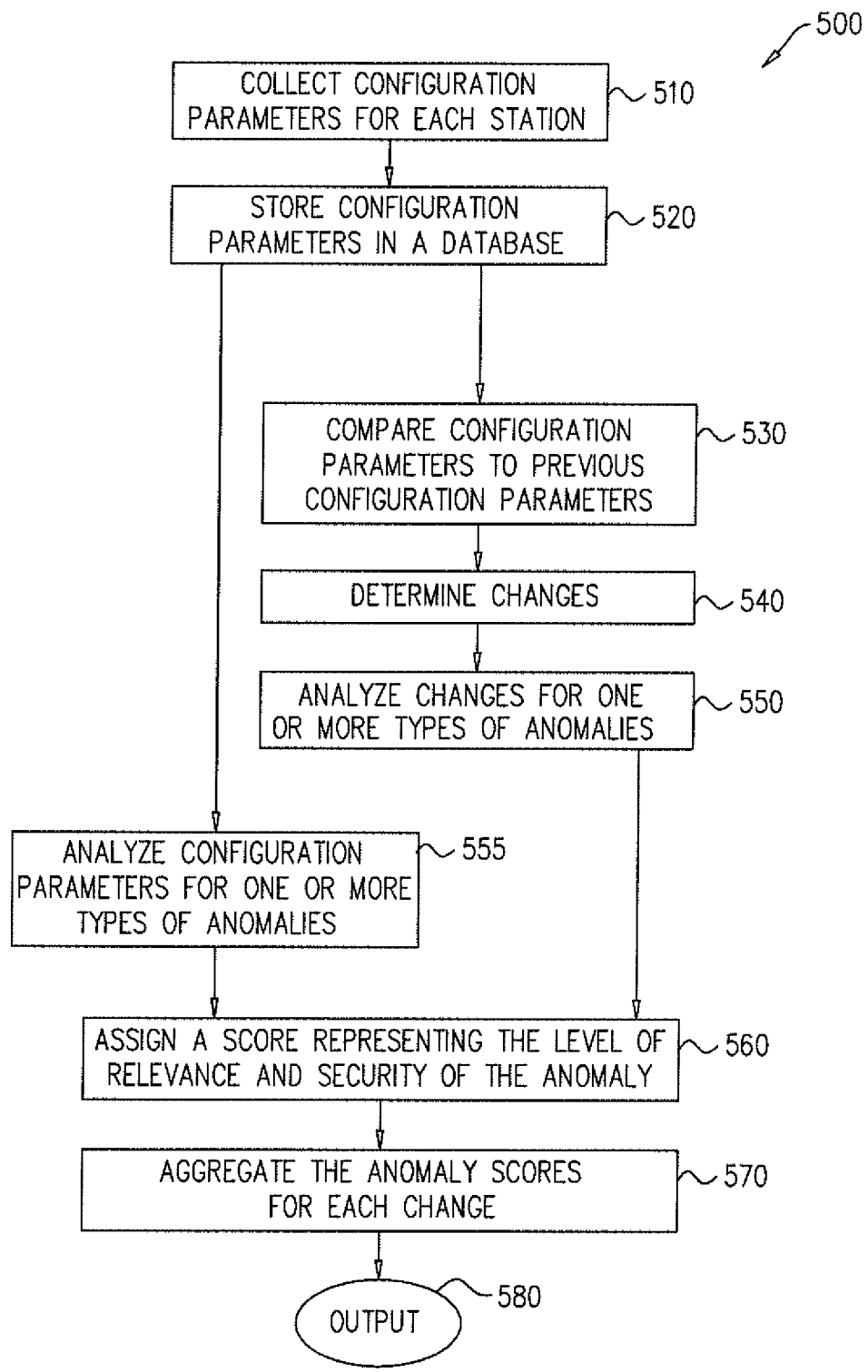
FIG. 5 is a flow diagram of a method of analyzing configuration parameters, according to an exemplary embodiment of the disclosure.

FIG. 5 is a flow diagram of a method 500 of analyzing and prioritizing configuration parameters, according to an exemplary embodiment of the disclosure. As explained above agent 130 collects (510) the configuration parameters 150 for each station 110 and transfers the configuration parameters 150 to be stored at database 160. Optionally, the configuration parameters 150 may be stored (520) directly in database 160 by agent 130 or transferred to agent server 170 for storing (520) the configuration parameters 150 in database 160. In an exemplary embodiment of the disclosure, agent server 170 retrieves the information from database 160 and analyzes the configuration parameters 150 by comparing (530) the configuration parameters 150 of each station with configuration parameters 150 collected at different times by the station 110, to identify changes over time (referred to as a drift). It should be noted that agent server 170 stores the configuration parameters 150 from essentially all the stations 110 of the network 120 so that the configuration parameters of similar stations 110 and/or similar applications on other stations 110 may be used to analyze the changes to a specific configuration parameter 150.

In an exemplary embodiment of the disclosure, agent server 170 determines (540) differences as a function of time. In some embodiments of the disclosure agent server 170 includes a knowledgebase 175 with rules for analyzing (550) the identified differences for anomalies. Optionally, agent server 170 uses the one or more anomaly detector routines 320 to analyze (550) the changes and detect anomalies.

In some embodiments of the disclosure, the configuration parameters 150 stored in database 160 are analyzed (555) directly by anomaly routines 320 without comparing (530) the configuration parameters 150 with previous configuration parameters 150 to determine (540) changes, thus providing an anomaly analysis of the current configuration parameters 150 of the system 100. Optionally, this option can be used to perform a health check of the current state of system 100. Alternatively, the anomaly routines may analyze both configuration parameters and configuration changes instead of one or the other.

In an exemplary embodiment of the disclosure, each anomaly detector routine 320 assigns (560) a score relating to the level of relevance and severity of the type of anomaly it analyzed. Optionally, the anomaly scores are aggregated (570) by the anomaly aggregator component 330. The aggregated scores are output (580) to the user, for example as a list on a display or printed report. Based on the list an administrator may be able to pin-point changes that are responsible for problems.

In an exemplary embodiment of the disclosure, a configuration parameter change can include adding a parameter, deleting a parameter and/or modifying a parameter.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure. It will also be appreciated by persons skilled in the art that the present disclosure is not limited to what has been particularly shown and described hereinabove.

We claim:

1. A method of analyzing and prioritizing configuration parameters in an information technology system, comprising:

collecting configuration parameters from computer stations connected in a network implementing the information technology system;

storing the collected configuration parameters in a database;

analyzing the configuration parameters by a set of anomaly routines, wherein each anomaly routine checks for a specific type of anomaly and provides a score representing a level of conformity of the value of the configuration parameters to the anomaly;

aggregating the anomaly scores;

outputting a list of configuration parameters with an aggregated anomaly score;

wherein the anomaly routines include identifying a delta anomaly that estimates if the value of the configuration parameter is in an expected range of values: wherein the expected range of values is obtained based on the values of the same configuration parameter in other stations of the network: and/or wherein the anomaly routines include identifying a policy violation anomaly that verifies that the value of the configuration parameter does not violate a user specified rule.

2. The method of claim 1, wherein the analyzing further comprises:

comparing the values of configuration parameters of a station from a later time with previous values of configuration parameters of the station;

determining changes in the configuration parameters by said comparing;

analyzing the determined changes by a set of anomaly routines, wherein each anomaly routine checks for a specific type of anomaly and provides a score representing the level of conformity of the changes in the configuration parameters to the anomaly.

3. The method of claim 2, wherein the anomaly routines analyze the configuration parameters and/or changes based on previous values, later values and meta-data related to the configuration parameters.

4. The method of claim 2, wherein the anomaly routines include comparing the data type of the previous value to the data type of the value at the later time and identifying an anomaly if the data type changed.

5. The method of claim 2, wherein the anomaly routines include identifying a relative difference anomaly that measures the difference between the previous value and the later value relative to the previous value.

6. The method of claim 5, wherein a larger relative difference is designated by a higher anomaly score.

7. The method of claim 5, wherein a downgraded software version is designated by a higher anomaly score than an upgraded version.

8. The method of claim 5, wherein an IP address change designating a network change is designated by a higher anomaly score than a subnet address change in the same local area network.

9. The method of claim 1, wherein the anomaly routines include identifying a benchmark anomaly that estimates if the value of the configuration parameter is in an expected range of values; wherein the expected range of values is obtained based on the values of the same configuration parameter in other stations of the network.

10. The method of claim 9, wherein the score for the benchmark anomaly is calculated as a Kullback-Leibler divergence between the likelihood of an expected value and the value of the configuration parameter.

11. The method of claim 1, wherein the score for the delta anomaly is calculated as a Kullback-Leibler divergence between the likelihood of an expected value and the value of the configuration parameter.

12. The method of claim 1, wherein the anomaly routines include identifying a consistency anomaly that verifies that the value of the configuration parameter is consistent with the changes in similar stations.

13. A non-transitory computer readable medium for storing program code to execute the method according to claim 1.

14. A method of analyzing and prioritizing configuration parameters in an information technology system, comprising:
collecting configuration, parameters from computer stations connected in a network implementing the information technology system;
storing the collected configuration parameters in a database;
analyzing the configuration parameters by a set of anomaly routines, wherein each anomaly routine checks for a specific type of anomaly and provides a score representing a level of conformity of the value of the configuration parameters to the anomaly;
aggregating the anomaly scores;
outputting a list of configuration parameters with an aggregated anomaly score;
wherein the analyzing further comprises:
comparing the values of configuration parameters of a station from a later time with previous values of configuration parameters of the station;
determining changes in the configuration parameters by said comparing;
analyzing the determined changes by a set of anomaly routines, wherein each anomaly routine checks for a specific type of anomaly and provides a score representing the level of conformity of the changes in the configuration parameters to the anomaly;
wherein the anomaly routines include comparing the data type of the previous value to the data type of the value at the later time and identifying an anomaly if the data type changed;
wherein a data type change from a numerical value to a non-numerical value or vice versa is more severe and is designated by a higher anomaly score than a change from one numerical representation to another.

15. A system for analyzing and prioritizing configuration parameters of applications in an information technology system, comprising:
an agent application configured to collect configuration parameters of applications executed on computer stations connected in a network implementing the information technology system;
a database configured to store the collected configuration parameters;
a server computer configured to execute a program that analyzes the configuration parameters by a set of anomaly routines, wherein each anomaly routine checks for a specific type of anomaly and provides a score representing a level of conformity of the value of the configuration parameter to the anomaly; aggregating the anomaly scores; and outputting a list of configuration parameters with an aggregated anomaly score;
wherein the anomaly routines include identifying a delta anomaly that estimates if the value of the configuration parameter is in an expected range of values; wherein the expected range of values is obtained based on the values of the same configuration parameter in other stations of the network; and/or
wherein the anomaly routines include identifying a policy violation anomaly that verifies that the value of the configuration parameter does not violate a user specified rule.

16. The system of claim 15, wherein analyzing the configuration parameters further comprises:
comparing the values of configuration parameters of a station from a later time with previous values of configuration parameters of the station;
determining changes in the configuration parameters by said comparing;
analyzing the determined changes by a set of anomaly routines, wherein each anomaly routine checks for a specific type of anomaly and provides a score representing the level of conformity of the changes in the configuration parameters to the anomaly.

17. The system of claim 16, wherein the anomaly routines include comparing the data type of the previous value to the data type of the value at the later time and identifying an anomaly if the data type changed.

18. The system of claim 16, wherein the anomaly routines include identifying a relative difference anomaly that measures the difference between the previous value and the value at the later time relative to the previous value.

19. The system of claim 18, wherein a larger relative difference is designated by a higher anomaly score.

20. The system of claim 18, wherein a downgraded software version is designated by a higher anomaly score than an upgraded version.

* * * * *